United States Patent
Pettersson et al.

(10) Patent No.: US 9,327,716 B2
(45) Date of Patent: May 3, 2016

(54) METHOD FOR CONTROLLING A DRIVE SYSTEM OF A VEHICLE, A DRIVE SYSTEM, A COMPUTER PROGRAM, A COMPUTER PROGRAM PRODUCT AND A VEHICLE

(71) Applicant: Scania CV AB, Södertälje (SE)

(72) Inventors: Niklas Pettersson, Stockholm (SE); Mikael Bergquist, Huddinge (SE); Johan Lindström, Nyköping (SE); Anders Kjell, Ekerö (SE); Mathias Björkman, Tullinge (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/411,135

(22) PCT Filed: Jun. 26, 2013

(86) PCT No.: PCT/SE2013/050789
§ 371 (c)(1),
(2) Date: Dec. 24, 2014

(87) PCT Pub. No.: WO2014/003670
PCT Pub. Date: Jan. 3, 2014

(65) Prior Publication Data
US 2015/0375734 A1    Dec. 31, 2015

(30) Foreign Application Priority Data
Jun. 27, 2012 (SE) .................................. 1250710

(51) Int. Cl.
*B60W 10/115* (2012.01)
*B60W 20/00* (2006.01)
(Continued)

(52) U.S. Cl.
CPC ........... *B60W 20/1062* (2013.01); *B60W 10/06* (2013.01); *B60W 10/10* (2013.01);
(Continued)

(58) Field of Classification Search
USPC ........................................................... 701/22
See application file for complete search history.

(56) References Cited

U.S. PATENT DOCUMENTS 6,354,974 B1    3/2002    Kozarekar ................ 475/5
6,558,283 B1    5/2003    Schnelle .................. 475/5
(Continued)

FOREIGN PATENT DOCUMENTS

DE    10 2007 004 463 A1    8/2008
DE    10 2007 042 949 A1    4/2009
(Continued)

OTHER PUBLICATIONS

International Search Report mailed Oct. 18, 2013 in corresponding PCT International Application No. PCT/SE2013/050789.

*Primary Examiner* — Shelley Chen
(74) *Attorney, Agent, or Firm* — Ostrolenk Faber LLP

(57) ABSTRACT

A method for controlling a drive system of a vehicle, the drive system including a combustion engine with an output shaft, a gearbox with an input shaft, an electrical machine including a stator and a rotor, and a planetary gear with a sun gear, a ring gear and a planet wheel carrier. The combustion engine may be active or inactive. A braking device may be active or passive. The planetary gear may be released or locked. The method includes arranging the planetary gear in the released state, the combustion engine in inactive state, the braking device in active state, and, when information on a requested torque for the operation of the vehicle is received, controlling the electrical machine to provide the requested torque with the combustion engine inactive, the braking device active and the planetary gear released.

16 Claims, 3 Drawing Sheets

(51) Int. Cl.
*B60K 6/365* (2007.10)
*B60W 10/06* (2006.01)
*B60W 10/18* (2012.01)
*B60W 10/10* (2012.01)
*B60W 10/02* (2006.01)

(52) U.S. Cl.
CPC .............. *B60W 10/18* (2013.01); *B60K 6/365* (2013.01); *B60W 10/02* (2013.01); *B60W 10/115* (2013.01); *B60W 20/1082* (2013.01); *B60W 20/1084* (2013.01); *B60W 20/40* (2013.01)

(56) References Cited

U.S. PATENT DOCUMENTS

| 8,292,770 | B2 * | 10/2012 | Novikov | H02K 16/00 475/150 |
|---|---|---|---|---|
| 2004/0168841 | A1 * | 9/2004 | Ohta | B60K 6/365 180/65.25 |
| 2004/0255904 | A1 * | 12/2004 | Izawa | B60K 6/445 123/352 |
| 2005/0209760 | A1 * | 9/2005 | Tabata | B60K 6/445 701/53 |
| 2008/0076623 | A1 * | 3/2008 | Tabata | B60K 6/445 477/5 |
| 2010/0044128 | A1 * | 2/2010 | Oba | B60K 6/387 180/65.25 |
| 2010/0048338 | A1 * | 2/2010 | Si | B60K 6/365 475/5 |
| 2010/0051360 | A1 * | 3/2010 | Oba | B60K 6/387 180/65.22 |
| 2010/0116615 | A1 * | 5/2010 | Oba | B60K 6/387 192/84.3 |
| 2010/0120579 | A1 * | 5/2010 | Kawasaki | B60K 6/365 477/3 |
| 2010/0125020 | A1 * | 5/2010 | Ikegami | B60K 6/365 477/3 |
| 2010/0173746 | A1 * | 7/2010 | Ideshio | B60K 6/365 477/36 |
| 2012/0065017 | A1 * | 3/2012 | Yamada | B60K 6/365 475/5 |

FOREIGN PATENT DOCUMENTS

| JP | WO 2014087210 A1 * | 6/2014 | ............ B60K 6/445 |
|---|---|---|---|
| WO | WO 2006/079909 A1 | 8/2006 | |

* cited by examiner

METHOD FOR CONTROLLING A DRIVE SYSTEM OF A VEHICLE, A DRIVE SYSTEM, A COMPUTER PROGRAM, A COMPUTER PROGRAM PRODUCT AND A VEHICLE

CROSS-REFERENCE TO RELATED APPLICATIONS

The present application is a 35 U.S.C. §§371 National Phase conversion of PCT/SE2013/050789, filed Jun. 26, 2013, which claims priority of Swedish Patent Application No. 1250710-9, filed Jun. 27, 2012, the contents of which are incorporated by reference herein. The PCT International Application was published in the English language.

TECHNICAL FIELD OF THE INVENTION

The present invention relates to a method for controlling a drive system of a vehicle, in particularly a hybrid vehicle. The drive system comprises a combustion engine with an output shaft, a gearbox with an input shaft, an electrical machine that comprises a stator and a rotor, and a planetary gear that comprises a sun gear, a ring gear and a planet wheel carrier.

The output shaft of the combustion engine is connected with a first of said components of the planetary gear so that they rotate as a unit with a first speed of rotation. The input shaft of the gearbox is connected with a second of said components of the planetary gear so that they rotate as a unit with a second speed of rotation. The rotor of the electrical machine is connected with a third of said components of the planetary gear so that said third component rotates with a third speed of rotation.

The drive system comprises a control unit that is adapted to control the electrical machine so that it provides the third component of the planetary gear with a speed of rotation that, together with the speed of rotation of the output shaft of the combustion engine, results in the input shaft of the gearbox rotating at a requested speed of rotation. The combustion engine operates in an idle state and an active state, where the speed of rotation in the idle state is lower than the speed of rotation in the active state.

The present invention further relates to a drive system for a vehicle according to the above.

PRIOR ART

Hybrid vehicles may be operated by a primary motor that may be a combustion engine and a secondary motor that may be an electrical machine. The electrical machine is equipped with at least a battery for storing electrical energy and control equipment for controlling the flow of electrical energy between the battery and the electrical machine. The electrical machine may work as a motor and as a generator depending on the operational condition of the vehicle. When the vehicle is slowed down, the electrical machine generates electrical energy that is stored in the battery. The stored electrical energy is utilized later for the operation of the vehicle. The electrical machine may be arranged between a clutch mechanism and the gearbox in the vehicle. Because of limited space, it is preferable to connect the electrical machine directly to the input shaft of the gearbox.

There are disadvantages in using a conventional clutch mechanism that disconnects the input shaft of the gearbox from the combustion engine during a change of gears in the gearbox. When the vehicle starts from a stand still position, the discs of the clutch mechanism glide towards each other. Accordingly, the discs are heated up. This heat results in increased fuel consumption and wear of the discs of the clutch. A conventional clutch mechanism is also relatively heavy and costly. It also requires a relatively large space in the vehicle.

Conventional drive systems are arranged so that they only offer a few operational modes that are adapted for the main loads of the operation of the vehicle. The operation of the vehicle by means of controlling the combustion engine and the electrical machine is based on the main operational condition of the vehicle and includes maintaining a charge level of the battery of the vehicle at a certain level. The combustion engine generates noise and releases exhaust gases, which are desirable to avoid in certain situations. For example, when driving the vehicle inside buildings, such as a bus depot, a parking house, etc., or in other areas where the requirements regarding noise and release of exhaust gases are higher than what is possible in the ordinary operation of a vehicle. It is also in certain situations, desirable to, in the short-term reduce fuel consumption of the vehicle.

U.S. Pat. No. 6,354,974 discloses a drive system for a hybrid vehicle. The hybrid vehicle comprises a combustion engine and an electrical machine that is arranged on the output shaft of the combustion engine. The purpose is here to create a compact drive unit that does not require a conventional clutch mechanism. The conventional clutch mechanism has been replaced by a planetary gear and three pieces of friction clutches. Using friction clutches, different operational conditions can be created for the vehicle. The use of friction clutches results in energy losses.

SUMMARY OF THE INVENTION

A first objective of the present invention is to provide a method for controlling a drive system of a vehicle with the purpose of allowing the vehicle to be driven in environments where noise and exhaust levels from the combustion engine are not permitted or are not desirable, and with higher torque compared with prior art. A second objective of the present invention is to provide a method for controlling a drive system so that fuel consumption is terminated temporarily. A third object of the present invention is to provide a method for controlling a drive system that results in lower energy loss compared with prior art.

These objectives are achieved with the previous mentioned method in which the drive system comprises a braking device (28) comprising an active state in which the combustion engine (2) is prevented from rotating and a passive state in which the combustion engine (2) is allowed to rotate, where the output shaft of the combustion engine is connected to the sun gear so that they rotate as a unit with a first speed of rotation, the input shaft of the gear box is connected to the planet wheel carrier so that they rotate as a unit with a second speed of rotation and the rotor of the electric machine is connected to the ring gear so that the ring gear rotates with a third speed of rotation, the method
   comprising the steps:
   arranging the planetary gear in the released state, the combustion engine in the active state, and the braking device in the active state,
   receiving information on a requested torque for the operation of the vehicle, and
   controlling the electrical machine so that the requested torque is provided while maintaining the combustion engine in the inactive state, the braking device in the active state and the planetary gear in the released state.

By arranging the combustion engine in the inactive state, the braking device in the active state and the planetary gear in the released state, and thereafter driving the vehicle exclusively by means of the electrical machine, noise and exhausts gases from the vehicle are reduced.

During pure electrical driving, the combustion engine is inactive and the vehicle is operated only by the electrical machine. In this driving mode, the electrical machine will be geared up according to the transmission ratio of the planetary gear so that torque of electrical machine is geared up to a stronger torque and the rotational speed of the electrical machine is geared down. This is preferable because it provides higher torque in the gearbox, which facilitates the use of the electrical machine in its maximum power range due to the higher rotational speed of electrical machine. A higher speed of rotation of the electrical machine is also favorable for reducing energy loss in the electrical machine.

The braking device is arranged in the active state, to prevent the combustion engine from rotating together with the electrical machine when the electrical machine exclusively provides torque for the operation of the vehicle. The combustion engine is maintained standing still or substantially standing still by means of the active state of the braking device. There is a risk that the combustion engine will be damaged if the combustion engine rotates together with the electrical machine, in particularly, because the speed of rotation of the electrical machine is larger than the speed of rotation of the combustion engine in the active state.

By means of the method, the electrical machine allows the vehicle to be operated independently and without being restricted by the combustion engine. It is therefore possible to use the higher speed of rotation of electrical machine for operation of the vehicle which results in less energy loss compared with a lower speed of rotation.

The configuration with the output shaft of the combustion engine connected to the sun gear, the input shaft of the gearbox connected to the planet wheel carrier and the rotor of the electric machine connected to the ring gear provides the advantage that the combustion engine may be locked in a standing state without the planet wheel carrier being locked. The planet wheel carrier is thus free to rotate, such that fatigue damage resulting from loading the same point of the planetary wheel axles, which happens if the planet wheel carrier is locked from rotation, is avoided.

According to an embodiment of the invention, the planet wheel carrier and the sun gear are locked to each other when the planetary gear is arranged in the locked state and the planet wheel carrier and the sun gear are released from each other when the planetary gear is arranged in the released state.

According to an embodiment of the invention, the gearbox comprises at least a forward gear and at least a reverse gear, the method comprises:
receiving information indicating if the vehicle is in a stand still state or a movable state,
If the vehicle is in the stand still state, the planetary gear is arranged in the released state, the combustion engine is arranged in the inactive state and the braking device in the active state, and
arranging the gearbox in a forward gear and the electrical machine is controlled so that a positive torque is generated, or
arranging the gearbox in a reverse gear and the electrical machine is controlled so that a negative torque is generated.

The method comprising that from a stand still state, arranging the gearbox in a forward gear and controlling the electrical machine so that a positive torque is generated is preferable when the combustion engine is to be started later on. The method comprising that from a stand still state arranging the gearbox in a reversed gear and controlling the electrical machine so that a negative torque is generated is preferable when the combustion engine is to be started later.

According to an embodiment of the invention, the method comprises:
receiving information on whether the vehicle is in a stand still state or a movable state,
if the vehicle is in the movable state, the braking device is arranged in the active state until the combustion engine is in a stand still position or substantially stand still position before the planetary gear is arranged in the released state. By means of first slowing down the combustion engine to the stand still position before the planetary gear is opened, it is assured that the electrical machine does not rotate the combustion engine.

According to an embodiment of the invention, the method comprises:
arranging the combustion engine in the inactive state by means of terminating feeding of fuel to the combustion engine.

According to an embodiment of the invention, the method comprises:
if the requested torque is negative when driving the vehicle and if the operation of the vehicle exclusively with the electrical machine is desired, the combustion engine is arranged in the inactive state by means of terminating feeding fuel to the combustion engine and the braking device is arranged in the active state. The combustion engine is quickly slowed down to a stand still position by means of both terminating the feeding of fuel to the combustion engine and arranging the braking device in the active state. Preferably, the termination of feeding of fuel and arranging the braking device in the active state are performed essentially at the same time.

According to an embodiment of the invention, the gearbox comprises at least a forward gear and at least a reverse gear, the method comprises:
arranging the planetary gear in the released state, arranging the combustion engine in the inactive state, and arranging the braking device in the active state,
If the requested torque is negative when driving the vehicle, the combustion engine is arranged in the inactive state by means of terminating feeding of fuel to the combustion engine and arranging the gearbox in the reverse gear. The combustion engine is quickly slowed down to a stand still position by means of both terminating feeding of fuel to the combustion engine and arranging the gearbox in the reverse gear. Preferably, terminating feeding of fuel and arranging the gearbox in the reverse gear is done at the same time.

According to an embodiment of the invention, the gearbox comprises at least a forward gear and at least a reverse gear, the method comprises:
arranging the planetary gear in the locked state, the combustion engine in the terminated state, and the braking device in the active state,
if the requested torque is negative when driving the vehicle, the combustion engine is arranged in the inactive state by means of terminating feeding of fuel to the combustion engine and arranging the gearbox in the reverse gear. The combustion engine is quickly slowed down to a stand still position by means of both terminating feeding of fuel to the combustion engine and arranging the gearbox in the reverse gear. Preferably, the termination of feeding fuel and arrangement of the gear box in the reversed gear is done at the same time.

A fourth objective of the present invention is to provide a method for controlling a drive system so that fuel consumption under certain situation is reduced. The fourth objective is achieved by means of an embodiment of the invention in which the drive system comprises means for determining the charge level of the battery for the operation of the electrical machine, wherein the method is initiated with the steps:
- receiving information on the charge level of the battery,
- determining whether the charge level of the battery exceeds a first level,
- if the charge level of the battery exceeds the first level, the subsequent steps in the method are performed, otherwise the method is terminated.

The operational mode is initiated on the basis of the charge level of the battery. If the charge level of the battery exceeds a first level, the operation is initiated where the electrical machine exclusively operates the vehicle. The first charge level of the battery is preferably a level that corresponds to the battery being essentially fully charged, in which it is preferable to initially operated the vehicle exclusively by means of the electrical machine.

According to an embodiment of the invention, the drive system comprises means for determining the charge level of the battery for operation of the electrical machine, wherein the method comprises:
- receiving information on the charge level of the battery,
- determining whether the charge level of the battery is lower than a second level,
- if the charge level of the battery is lower than the second level, the method is terminated, otherwise the method is continued.

The method is terminated on basis of the charge level of the battery. If the charge level of the battery is lower than a second level, the operational mode is terminated including the electrical machine exclusively operates the vehicle. The second charge level of the battery is preferably a level where it is necessary to charge the battery by means of energy generated from the combustion engine.

The present invention also relates to the previously mentioned drive system. The drive system comprises a braking device comprising an active state in which the combustion engine is prevented from rotating and a passive state in which the combustion engine is allowed to rotate, and a control unit adapted to arrange the planetary gear in the released state, the braking device in the active state and the combustion engine in the inactive state, and to control the electrical machine on basis of the requested torque while maintaining the combustion engine in the inactive state, the braking device in the active state and the planetary gear in the released state, the output shaft (2a) of the combustion engine being connected to the sun gear (10) so that they rotate as a unit with a first speed of rotation (n1), the input shaft (3a) of the gear box being connected to the planet wheel carrier (12) so that they rotate as a unit with a second speed of rotation (n2) and the rotor (9b) of the electric machine being connected to the ring gear (11) so that the ring gear (11) rotates with a third speed of rotation (n3).

According to an embodiment of the invention, the planet wheel carrier and the sun gear are locked to each other when the planetary gear is arranged in the locked state and the planet wheel carrier and the sun gear are released from each other when the planetary gear is arranged in the released state.

According to an embodiment of the invention, the braking device acts on any of a flywheel of the combustion engine, a shaft connected to the planetary gear and a third of said three components of the planetary gear. Preferably the braking device acts on the flywheel of the combustion engine.

According to an embodiment of the invention, the braking device comprises means for controlling the torque of the braking force on the combustion engine or a component in connection to the combustion engine. According to an embodiment of the invention, the braking device is a spring loaded brake.

According to an embodiment of the invention, the braking device is adapted to be displaced between a first position in engagement with the combustion engine or a component in connection with the combustion engine, and a second position not in contact with the combustion engine or a component connected to the combustion engine.

According to an embodiment of the invention, the braking device comprises a locking pin. The locking pin enables locking of the rotation of the combustion engine. Preferably, the locking pin acts on the flywheel of the combustion engine.

According to an embodiment of the invention, the drive system comprises means for determining the charge level of the battery for operating the electrical machine, wherein the control unit is adapted to arrange the combustion engine in the inactive state, the braking device in the active state and the planetary gear in the released state, and to control the electrical machine when the charge level of the battery exceeds a first level.

According to an embodiment of the invention, the drive system comprises means for determining the charge level of a battery for operation of electrical machine, wherein the control unit is adapted to arrange the combustion engine in the active state, the braking device in the passive state and the planetary gear in the locked state when the charge level of the battery is lower than a second level.

BRIEF DESCRIPTION OF THE DRAWINGS

In the following, as an example, preferable embodiments of the invention with reference to the annexed drawings will be described, in which.

DETAILED DESCRIPTION OF PREFERRED EMBODIMENTS OF THE INVENTION

Figure 1A:
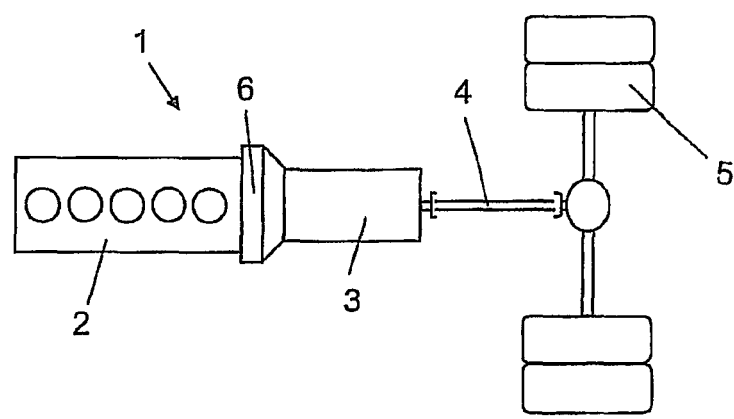
FIG. 1a discloses a drive system for operation of a vehicle according to the present invention.

FIG. 1a discloses a driveline for a heavy vehicle 1. The driveline comprises a combustion engine 2, a gearbox 3, a plurality of drive shafts 4 and drive wheels 5. The drive line comprises an intermediate part 6 between the combustion engine 2 and the gearbox 3.

Figure 1B:
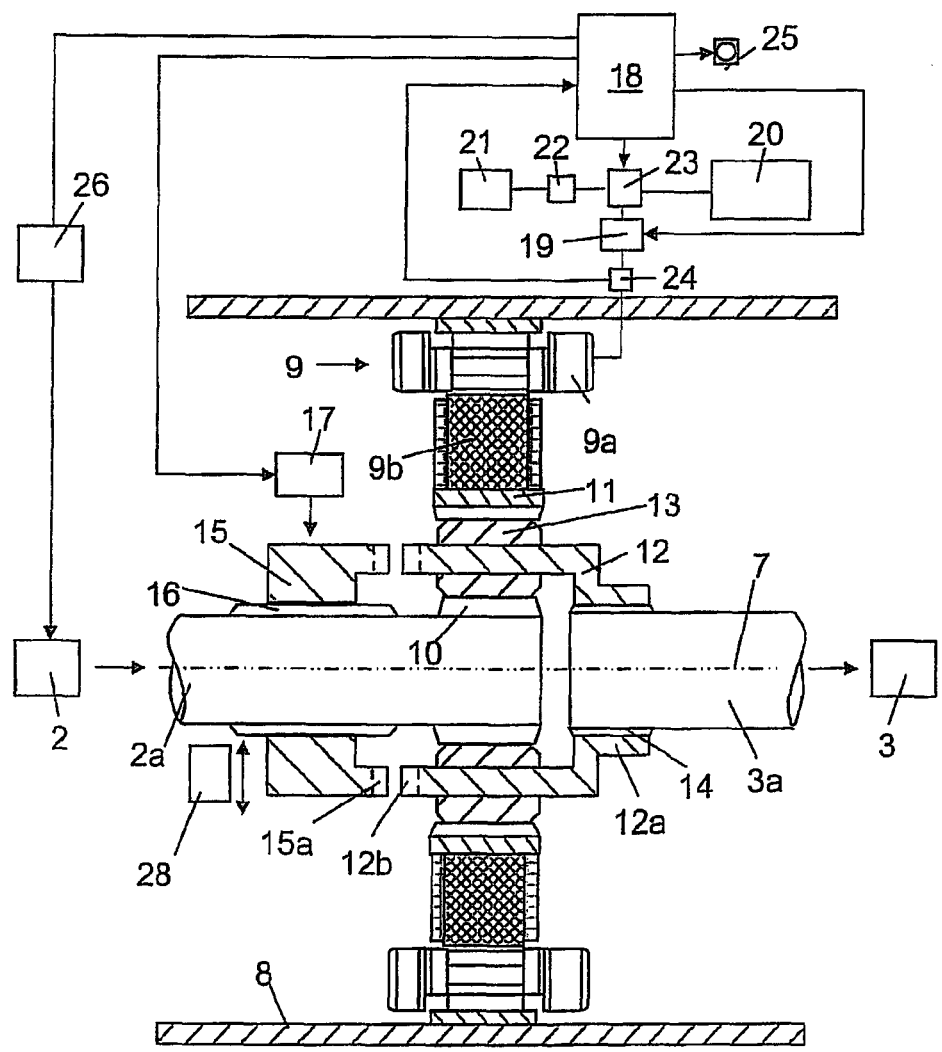
FIG. 1b discloses the drive system in FIG. 1a in detail.

FIG. 1b discloses the components in the intermediate part 6 in detail. The combustion engine 2 is provided with an output shaft 2a and the gear box 3 is provided with an input shaft 3a in the intermediate part 6. The output shaft 2a of the combustion engine is coaxially arranged in relation to the input shaft 3a of the gearbox. The output shaft 2a of the combustion engine and the input shaft 3a of the gearbox are rotatably arranged around the axis 7. The intermediate part 6 comprises a housing 8 that encloses an electrical machine 9 and a planetary gear. The electrical machine 9 comprises in a stator 9a and a rotor 9b. The stator 9a comprises a stator core that is attached in suitable way on the inside of the housing 8. The stator core comprises windings of the stator. The electrical machine 9 is adapted to, during certain operational modes, utilize stored electrical energy for providing power to the input shaft 3a of the gearbox and during other operational modes, utilize kinetic energy of the input shaft 3a of the gearbox for generating and storing electrical energy.

The planetary gear is arranged essentially radially inside of the stator 9a and the rotor 9b of the electrical machine. The planetary gear comprises a sun gear 10, a ring gear 11 and a planet wheel carrier 12. The planet wheel carrier 12 carries a number of cog wheels 13 that are rotatably arranged in a radial space between the cogs of the sun gear 10 and the ring gear 11. The sun gear 10 is attached on a peripheral surface of the output shaft 2a of the combustion engine. The sun gear 10 and the output shaft 2a of the combustion engine rotate as a unit with a first speed of rotation $n_1$. The planet wheel carrier 12 comprises an attachment part 12a that is attached on a peripheral surface of the input shaft 3a of the gearbox by means of a spline attachment 14. By means of this attachment, the planet wheel carrier 12 and the input shaft 3a of the gearbox rotate as a unit with a second speed of rotation $n_2$. The ring gear 11 comprises an external peripheral surface on which the rotor 9b is attached. The rotor 9b and the ring gear 11 comprise a rotatable unit that rotates with a third speed of rotation $n_3$.

The drive system comprises locking means adapted to switch the planetary gear between a released state in which the sun gear 10, the ring gear 11 and the planet wheel carrier 12 are freely rotatable in relation to each other, and a locked state in which the planet wheel carrier 12 and the sun gear 10 are locked to each other. The locking means are adapted in the locked state to connect the ring gear 11 and the planet wheel carrier 12 so that they rotate together.

The change between the locked state and the released state comprises controlling the electrical machine 9 and the combustion engine 2 to a condition mutually free of torque and thereafter displacing the locking means from/to engagement with the ring gear 11 and the planet wheel carrier 12.

The locking means comprises a displaceable connection member 15 on the output shaft 2a of the combustion engine.

The connection member 15 is attached on the output shaft 2a of the combustion engine by means of a spline attachment 16. The connection member 15 is, in this case, rigidly attached with regards to torsion on the output shaft 2a of the combustion engine and displaceable in an axial direction on the output shaft 2a of the combustion engine. The connection member 15 comprises a connection part 15a that is connectable with a connecting part 12b of the planet wheel carrier 12. The locking means further comprises a displacement member 17 adapted to displace the connection member 15 between the released state when the connection parts 15a, 12b are not in engagement with each other and the locked state when the connection part 15a, 12b are in engagement with each other. When the connection parts 15a, 12b are in engagement with each other, the output shaft 2a of the combustion engine and the input shaft 3a of the gearbox will rotate with the same speed of rotation.

An electrical control unit 18, or a plurality of electrical control units 18 in combination, are adapted to control the displacement member 17. The control unit 18 is also adapted to determine at when the electrical machine 9 will work as a motor and when it will work as a generator. To determine this, the control unit 18 may receive immediate information from suitable operational parameters. The control unit 18 may be a computer with suitable software for this purpose. The control unit 18 also controls schematically illustrated control equipment 19 that controls the flow of electrical energy between energy storage 20 and the stator 9a of the electrical machine 9. When the electrical machine 9 works as a generator, electrical energy is provided to the energy storage 20 from the stator 9a. The energy storage 20 delivers and stores electrical energy with a voltage in the range of 300-700 volts. It is necessary that the electrical machine 9 and the planetary gear compose a compact unit because the intermediate part 6, between the combustion engine 2 and the gearbox 3, in a vehicle is limited in size. The components of the planetary gear 10-12 are arranged essentially radially on the inside of the stator 9a of the electrical machine. The rotor 9b of the electrical machine, the ring gear 11 of the planetary gear, the output shaft 2a of a combustion engine and the input shaft 3a of the gearbox are rotatably arranged around a common rotation axis 7. With this arrangement, the electrical machine 9 and the planetary gear requires a relatively small space.

The vehicle comprises a 24 volt battery 21 for starting the combustion engine 2 and operation of auxiliary equipment in the vehicle 1. In heavy vehicle 1 a 24 volt battery 21 with a relatively high capacity is used. The 24 volt battery 21 is, by means of an electrical conductor and a connection mechanism 23, connectable with the stator 9a of electrical machine. The electrical conductor comprises a DC-DC transformer 22 between the 24 Volt battery 21 and the connection mechanism 23. The DC-DC transformer 22 has the capacity to transform electrical energy, that is conducted from the stator 9a of the electrical machine, which delivers electrical energy with the same voltage of the energy storage 20, to the voltage that prevails in the 24 voltage battery 21. The DC-DC transformer 22 is preferably of two-way type. It can, when necessary, conduct electrical energy from the 24 volt battery 20 to the stator 9a of electrical machine. When electrical energy is conducted in this direction, the DC-DC transformer 22 transforms electrical energy with a voltage of 24 volt to the higher voltage of the energy storage 20.

The drive system comprises a braking device 28 which may be in an active state or a passive state. The braking device 28 comprises a braking member that is adapted to act on a component of the drive system so that, in the active state, the output shaft 2a of the combustion engine is slowed down to a standstill position where the output shaft 2a of the combustion engine is prevented from rotating together with the electrical machine. In the passive state, the braking member does not contact with a component of the drive system.

The braking device 28 prevents the output shaft 2a of the combustion engine from rotating with the rotation of the electrical machine 9 when the planetary gear is in the released state and the operation of the vehicle occurs exclusively by means of the electrical machine 9.

The braking member is displaceable between a first position and a second position. In the first position, the braking member is in engagement with the combustion engine 2 or a component connected to the combustion engine 2. In the second position, the braking member does not contact the combustion engine 2 or a 2 component connected to the combustion engine 2. Preferably, the braking member is in engagement with a flywheel of the combustion engine 2 in the first position.

The method of the invention will be explained in detail with reference to FIGS. 2-4. The steps of the method are controlled by the control unit 18.

Figure 2:
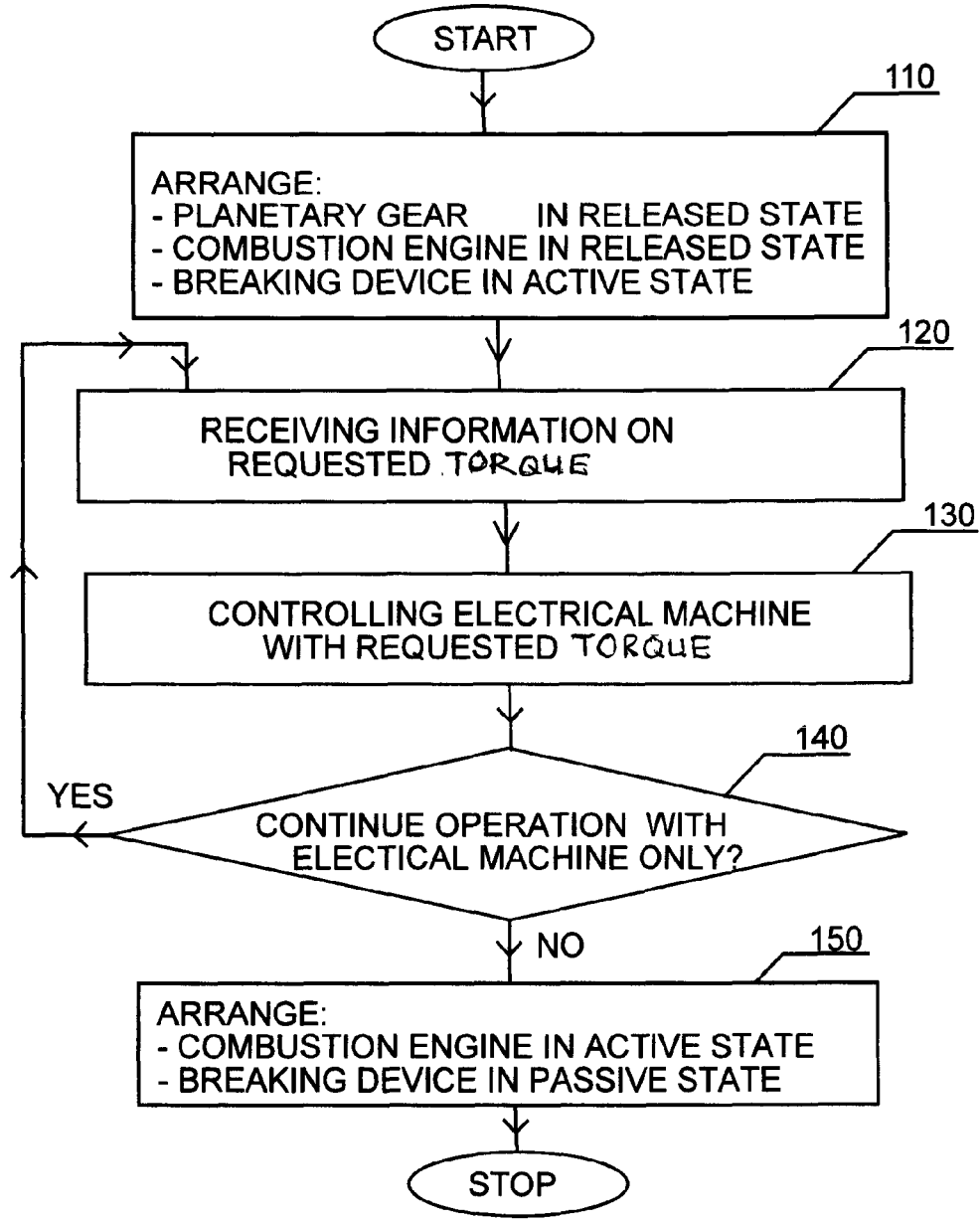
FIG. 2 discloses a flow chart of a method for controlling a drive system according to a first embodiment of the invention.

FIG. 2 discloses a method according to a first embodiment of the invention. The method is initiated in a step 110 by arranging the planetary gear in the released state, the combustion engine 2 in the inactive state and the braking device 28 in the active state. By means of step 110, the drive system is arranged to be operated exclusively by means of the electrical machine 9. In this operation mode, the electrical machine 9 will be geared up according to the transmission ratio of the planetary gear so that the torque of electrical machine is geared up to a stronger torque and the speed of rotation of electrical machine is geared down, which results in higher torque in the gearbox, which makes it possible to use the electrical machine 9 in its maximum power range and reduces energy loss of the electrical machine 9.

In step 120, the control unit 18 receives information indicating a requested torque for operation of the vehicle, and in a step 130, the control unit controls the electrical machine 9 so that the requested torque is provided exclusively by the electrical machine 9.

In step 140, it is determined whether operation of the vehicle is to continue exclusively by means of the electrical machine 9. If continued operation exclusively by means of the electrical machine 9 is desired, the method is repeated from step 120. Otherwise the method is terminated in step 150 by arranging the combustion engine 2 in the active state and the braking device 28 in the passive state.

Figure 3:
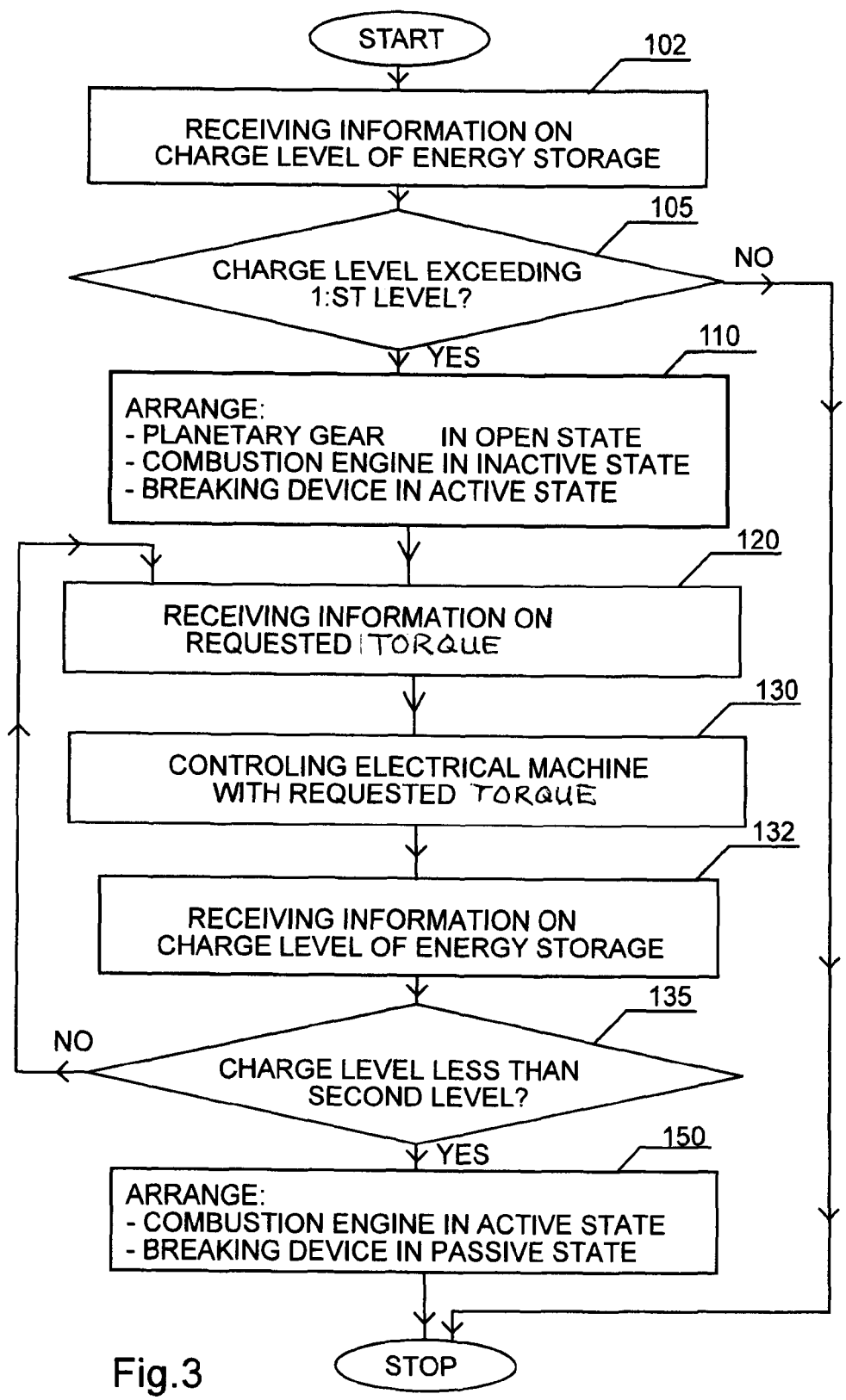
FIG. 3 discloses a flow chart of a method for controlling a drive system according to a second embodiment of the invention.

FIG. 3 discloses a method according to a second embodiment of the invention. The second embodiment differs from the first embodiment in regards to how the operation exclusively by means of electrical machine 9 is initiated and terminated.

The method is initiated in step 102 by receiving information indicating a charge level of the battery 20 that provides the electrical machine 9 with electrical power. In step 105, it is determined whether the charge level exceeds a first level. If the charge level exceeds the first level, the method is continued according to steps 120-150. If, on the other hand, the charge level does not exceed the first level, the method is terminated.

The method is terminated in step 132 by receiving information indicating the charge level of a battery 20 that provides the electrical machine 9 with electrical power. In step 135, it is determined whether the charge level is lower than a second level. If the charge level is lower than the second level, the method is terminated in step 150 in the same manner as in FIG. 2. If, on the other hand, the charge level is not lower than the second level, the method continues according to steps 120-135.

When operation is exclusively by means of the electrical machine 9, the combustion engine 2 must be slowed down/locked so that the reaction torque from the planetary gear does not make it rotate forward or backwards. If not, there would be no limit on how fast the combustion engine 2 could rotate and the combustion engine 2 could be damaged. Furthermore, friction losses would be created in the combustion engine 2.

The braking of the combustion engine 2 may be realized by a controllable braking device 28 that is torque controlled, a spring loaded braking device 28 with a constant brake torque or any type of locking pin. The braking device 28 may act on the flywheel of the combustion engine, on the shaft to the planetary gear or on the sun gear of the planetary gear.

There are a number of ways to switch to pure electrical driving. From a standing still position, the combustion engine 2 is slowed down, the planetary gear is in the released state, the gearbox is arranged with a forward gear, and a positive torque is provided by the electrical machine 9. This mode is preferable when it is necessary to choose between different gears during driving. Alternatively from a standing still state, the combustion engine 2 is slowed down, the planetary gear is in the released state, the gearbox is arranged in a reversed gear, and a negative torque is provided by the electrical machine 9. This mode of driving is preferable when the combustion engine is to be started later.

There are a number of ways to switch to pure electrical driving. From a position in which the vehicle is driving with the planetary gear in the locked state, the planetary gear is arranged in the released state, and the combustion engine 2 is slowed down until it is stopped. At positive drive line torque, the combustion engine 2 is slowed down, preferably to a stand still position, by terminating feeding of fuel into the engine. At negative drive line torque, the combustion engine 2 is slowed down, preferably to a stand still position, by terminating feeding of fuel and applying the braking device 28, or alternatively changing gear to a reverse gear and terminating feeding of fuel. The same method is possible from a position in which the vehicle is driving with the planetary gear in an open state, except that the planetary gear no longer needs to be changed.

The invention is not limited to the disclosed embodiments but can be modified and varied within the framework of the following claims. It is for example possible to combine the features in the two embodiments to a separate embodiment.

The invention claimed is:

1. A method for controlling a drive system of a vehicle, wherein the drive system comprises:

a combustion engine operable in an active state or an inactive state, the combustion engine including an output shaft;

a gearbox including an input shaft;

an electrical machine that comprises a stator and a rotor, and a planetary gear that comprises three components in the form of a sun gear, a ring gear and a planet wheel carrier;

the output shaft of the combustion engine is connected with a first one of the three components of the planetary gear so that rotation of the output shaft causes rotation of the first component, the input shaft of the gearbox is connected with a second one of the three components of the planetary gear so that rotation of the input shaft causes rotation of the second component, and the rotor of the electrical machine is connected with a third one of the three components of the planetary gear so that rotation of the rotor causes rotation of the third component;

locking means movable between a locked state in which two of the three components of the planetary gear are locked together so that the three components rotate with the same speed of rotation, and a released state in which the three components are allowed to rotate with different speeds of rotation;

a braking device which is in an active state in which the combustion engine is prevented from rotating or in a passive state in which the combustion engine is allowed to rotate;

the output shaft of the combustion engine is connected to the sun gear so that they rotate as a unit with a first speed of rotation;

the input shaft of the gear box is connected to the planet wheel carrier so that they rotate as a unit with a second speed of rotation; and the rotor of the electrical machine is connected to the ring gear so that the ring gear rotates with a third speed of rotation;

the method comprising the steps:

arranging the planetary gear in the released state, the combustion engine in the inactive state, and the braking device in the active state;

receiving information indicating a requested torque for the operation of the vehicle; and controlling the electrical machine so that the requested torque is provided while maintaining the combustion engine in the inactive state, the braking device in the active state and the planetary gear in the released state.

2. The method for controlling a drive system according to claim 1, further comprising:
locking the planet wheel carrier and the sun gear to each other while locking the planetary gear in the locked state; and
releasing the planet wheel carrier and the sun gear from each other while releasing the planetary gear in the released state.

3. The method for controlling a drive system according to claim 1 wherein the method comprises:
arranging the combustion engine in the inactive state by terminating feeding of fuel to the combustion engine.

4. The method for controlling a drive system according to claim 1, wherein the method comprises:
arranging the combustion engine in the inactive state by terminating feeding of fuel to the combustion engine, wherein the requested torque is negative when driving the vehicle while operating the vehicle by means of the electrical machine.

5. The method for controlling a drive system according to claim 1, wherein the gearbox comprises at least a forward gear and at least a reverse gear, and the method further comprises:
receiving information indicating if the vehicle is in a standing still state, or in a moving state;
arranging the combustion engine in the inactive state, and the braking device in the active state, when the vehicle is in the standing still state, and the planetary gear is arranged in the released state; and
arranging the gearbox in a forward gear and controlling the electrical machine to generate a positive torque; or
arranging the gearbox in a reversed gear and controlling the electrical machine to generate a negative torque.

6. The method for controlling a drive system according to claim 1, wherein the drive system further comprises means for determining a charge level of a battery for operation of the electrical machine, the method further comprising:
receiving information on the charge level of the battery;
determining if the charge level of the battery exceeds a first level prior to the step of arranging the planetary gear in the released state, the combustion engine in the inactive state, and the braking device in the active state, and,
proceeding to the step of arranging the planetary gear in the released state, the combustion engine in the inactive state, and the braking device in the active state, if the charge level of the battery exceeds the first level.

7. The method for controlling a drive system according to claim 1, wherein the drive system further comprises means for determining a charge level of a battery for the operation of the electrical machine, wherein the method comprises:
receiving information on the charge level of the battery;
determining whether the charge level of the battery is lower than a second level; and
proceeding to step of arranging the planetary gear in the released state, the combustion engine in the inactive state, and the braking device in the active state, if the charge level of the battery is lower than the second level.

8. The method for controlling a drive system according to claim 1, wherein the method further comprises the step of:
arranging the braking device in the passive state and arranging the combustion engine in the active state to terminate the method.

9. A drive system for a vehicle, comprising:
a combustion engine operable in an active state or an inactive state, the combustion engine including an output shaft;
a gearbox including an input shaft;
an electrical machine that comprises a stator and a rotor;
a planetary gear that comprises three components in the form of a sun gear, a ring gear and a planet wheel carrier;
the output shaft of the combustion engine is connected with a first one of the three components of the planetary gear so that rotation of the output shaft causes rotation of the first component, the input shaft of the gearbox is connected with a second one of the three components of the planetary gear so that rotation of the input shaft causes rotation of the second component and the rotor the electrical machine is connected with a third one of the three components of the planetary gear so that rotation of the rotor causes rotation of the third component;
locking means transferable movable between a locked state in which two of the three components of the planetary gear are locked together so that the three components rotate with the same speed of rotation and a released state in which the three components are allowed to rotate with different speeds of rotation;
a braking device which is in an active state in which the combustion engine is prevented from rotating or in a passive state in which the combustion engine is allowed to rotate;
a control unit configured to arrange the planetary gear in the released state, the braking device in the active state and the combustion engine in the inactive state, and to control the electrical machine based on a requested torque while maintaining the combustion engine in the inactive state, the braking device in the active state and the planetary gear in the released state;
the output shaft of the combustion engine connected to the sun gear so that they rotate as a unit with a first speed of rotation, the input shaft of the gear box connected to the planet wheel carrier so that they rotate as a unit with a second speed of rotation, and the rotor of the electric machine-being connected to the ring gear so that the ring gear rotates with a third speed of rotation.

10. The drive system for a vehicle according to claim 9, wherein the planet wheel carrier and the sun gear are locked to each other when the planetary gear is arranged in the locked state, and the planet wheel carrier and the sun gear are released from each other when the planetary gear is arranged in the released state.

11. The drive system for a vehicle according to claim 9, wherein the braking device acts on one of a flywheel of the combustion engine, a shaft connected to the planetary gear, and the third of the three components of the planetary gear.

12. The drive system for a vehicle according to claim 9, wherein the braking device comprises a braking member displaceable between a first position in engagement with the combustion engine, or with a component connected to the combustion engine, and a second position not in contact with the combustion engine, or with a component connected to the combustion engine.

13. The drive system for a vehicle according to claim 9, wherein the drive system comprises means for determining a charge level of a battery for operation of the electrical machine, wherein the control unit arranges the combustion engine in the inactive state, the braking device in the active state and the planetary gear in the released state, and controls the electrical machine when the charge level of the battery exceeds a first level.

14. The drive system for a vehicle according to claim 9, wherein the drive system comprises means for determining a charge level of a battery for operation of the electrical machine, wherein the control unit arranges the combustion engine in the active state, the braking device in the passive state and the planetary gear in the locked state when the charge level of the battery is lower than a second level.

15. A computer program product including a non-transitory data storing medium and a computer program comprising computer program code readable by a computer stored on the medium, the code enabling a computer to implement a method according to claim 1 when the computer program code is executed in the computer.

16. A vehicle comprising a drive system according to claim 9.

\* \* \* \* \*